United States Patent [19]

Leclerc et al.

[11] 4,353,616
[45] Oct. 12, 1982

[54] OPTICAL DEVICE FOR PRINTING PLANAR OBJECTS

[75] Inventors: Pierre Leclerc; Jean-Pierre Huignard; Philippe Aubourg, all of Paris, France

[73] Assignee: Thomson-CSF, Paris, France

[21] Appl. No.: 121,178

[22] Filed: Feb. 13, 1980

[30] Foreign Application Priority Data

Feb. 16, 1979 [FR] France ................. 79 04016

[51] Int. Cl.³ .............. G03H 1/22; G03H 1/28; G03H 1/32
[52] U.S. Cl. ..................... 350/3.75; 350/3.85
[58] Field of Search ............... 350/3.77, 3.81, 3.61, 350/3.62, 3.64, 3.85, 3.86, 3.69, 3.75

[56] References Cited

U.S. PATENT DOCUMENTS

| | | |
|---|---|---|
| 3,542,452 | 11/1970 | Gerritsen . |
| 3,640,599 | 2/1972 | Van Ligten .................. 350/3.81 |
| 3,677,616 | 7/1972 | Lewis ........................ 350/3.81 |
| 3,682,526 | 8/1972 | Matsumoto .................. 350/3.81 |
| 3,717,415 | 2/1973 | Woerdman . |
| 3,819,248 | 6/1974 | Takeda et al. ............... 350/3.81 |
| 3,847,465 | 11/1974 | Micheron et al. . |
| 4,035,055 | 7/1977 | Lurie . |
| 4,138,189 | 2/1979 | Huignard et al. . |
| 4,256,363 | 3/1981 | Briones ..................... 350/3.86 |

OTHER PUBLICATIONS

Physics Letters, vol. 24 (A), No. 2, Jan. 16, 1967-W. Martienssen et al., "Holographic Reconstruction without Granulation", pp. 126-128.
Applied Optics, vol. 14, No. 7, Jul. 1975-S. Som et al., "Noise Reduction by Continuous Addition of Subchannel Holograms", p. 1702.
Journal of the Optical Society of America, vol. 67, No. 1, Jan. 1977, New York-R. Hellwarth "Generation of Time-Reversed Wave Fronts by Nonlinear Refraction", pp. 1-3.
Applied Physics Letters, vol. 32, No. 3, Feb. 1978, New York, S. Jensen et al., "Observation of the Time Reversed Replica of a Monochromatic Optical Wave", pp. 166-168.

Primary Examiner—F. L. Evans
Assistant Examiner—Bruce Y. Arnold
Attorney, Agent, or Firm—Oblon, Fisher, Spivak, McClelland & Maier

[57] ABSTRACT

The invention relates to an optical printing device with unity magnification using coherent light and making it possible to significantly reduce speckle on the print.

It relates to a printing device comprising a device for illuminating the object, a device receiving the object wave and in real time restoring a wave phase conjugate with the object wave to form a real image of the object. The printing device also comprises a photosensitive support placed in the image plane. The object illuminating device forms on the object to be reprinted a lighting spot which is of small size compared with the object, and the printing device also comprises scanning means for completely scanning the object a number of times by the lighting spot so as to superimpose a large number of images of the same zone having uncorrelated noises on the photosensitive support.

The invention, more particularly, finds application in the printing of high resolution masks and large surface areas.

12 Claims, 4 Drawing Figures

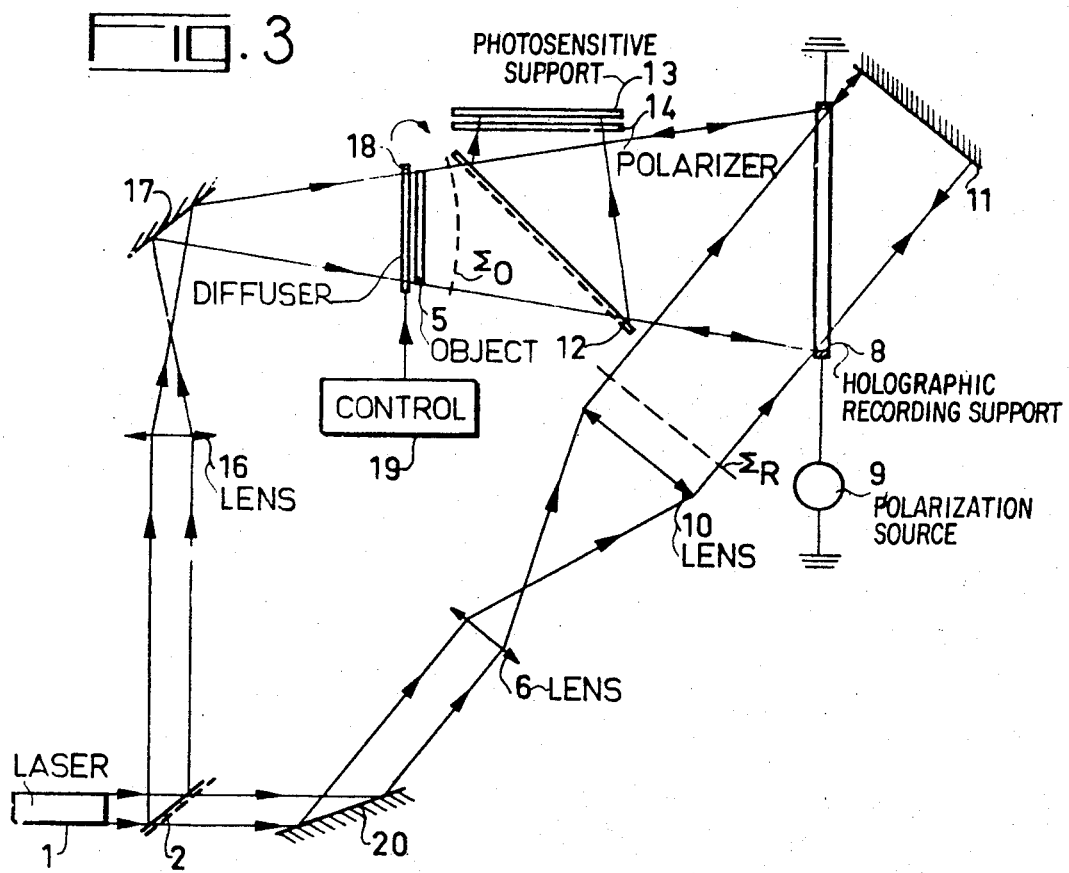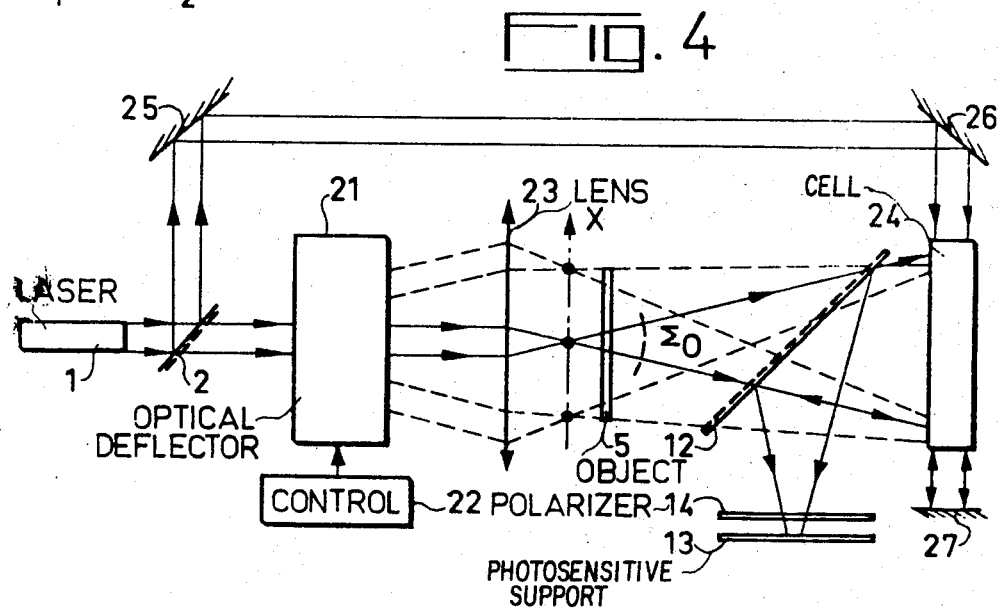

OPTICAL DEVICE FOR PRINTING PLANAR OBJECTS

BACKGROUND OF THE INVENTION

The present invention relates to the field of the duplication of extensive planar objects and more particularly to an optical printing device for planar objects having unity magnification, being more specifically applicable to the duplication of high resolution masks.

The generation of a wave front coupled with an object wave front makes it possible to form a real image of the object. This generation can be obtained by holography. On the basis of the hologram of an object recorded in a holographic support and by illuminating the hologram with a reading beam it is possible to obtain an image of the object illuminated during the recording. If the reading beam has the opposite transmission direction to that of the reference beam during restoration, a real image of the object is formed and this image can be recorded on a photosensitive support placed in an image plane. As the beams are coherent, the restored wave front is stigmatic for all points of the image. However, due to the coherent nature of the object beam and reference beam, the restored image is subject to laser speckle, which significantly reduces the said signal to noise ratio in the restored image. Thus, the image appears fuzzy through light points, this modulation of the image being superimposed on the surface image. Account must be taken of this phenomenon in any application necessitating the projection of a real image onto a photosensitive surface. There are several possible solutions for limiting the effects thereof in the restored image.

A first solution consists of forming a relatively large hologram in order to obtain in the projected image a greater resolution than that required for the recording of this image on the photosensitive support. Thus, if the size of the light grains formed is small compared with the smallest dimension of the recorded pattern, the pattern is recorded with an average noise corresponding to the average intensity over several grains. Such a solution is not sufficient for the reproduction of large high resolution masks.

The averaging action can also be obtained by juxtaposing a large number of small holograms in a conventional, non-obliteratable holographic support which is able to restore an image after developing. In this case, each hologram restores a complete real image of the object on the photosensitive surface and the superimposing of these images containing the same information but with different noise levels leads to an averaging of the noise on the surface. However, in order to improve the signal to noise ratio in a by a factor n, the number of superimposed images must be n², which necessitates a very large holographic recording support compared with the object to be reproduced.

BRIEF SUMMARY OF THE INVENTION

The invention relates to an optical device for printing planar objects making it possible to average the noise and which obviates the disadvantage of the fuzziness of the restored image due to speckle and retains the stigmatism qualities of the restored image obtained by the use of coherent light.

The invention specifically relates to an optical device for printing planar objects comprising a coherent light source, an illuminating device forming an object wave for illuminating the object from the coherent light from the source, as well as a reference wave and a photosensitive support. The optical device also comprises an optically active device for receiving the object wave emerging from the object and the reference wave and for restoring in real time a wave, phase conjugate with the incident object wave and directed towards the photosensitive support to form therein a real image of the object to be printed. The illuminating device is such that the object is successively illuminated several times in order to superimpose a plurality of images of the object having uncorrelated noises in the photosensitive support.

The illumination of the object can be obtained by several successive scans thereof by a small diameter lighting spot or by a number of successive exposures of the object as a whole through a rotary diffuser. The optically active medium makes it possible to generate in real time a wave front phase conjugate with the wave front emerging from the object and can, for example, be a reversible holographic material or a sodium vapour cell operating by non-linear mixing.

BRIEF DESCRIPTION OF THE DRAWINGS

The invention is described in greater detail hereinafter with reference to non-limitative embodiments and the attached drawings, in which:

FIG. 3 is a diagram of a second embodiment of the printing device also utilizing holographic printing.

FIG. 4 is a diagram of a third embodiment of the printing device operating by non-linear mixing.

DETAILED DESCRIPTION OF THE PREFERRED EMBODIMENTS

Figure 1:
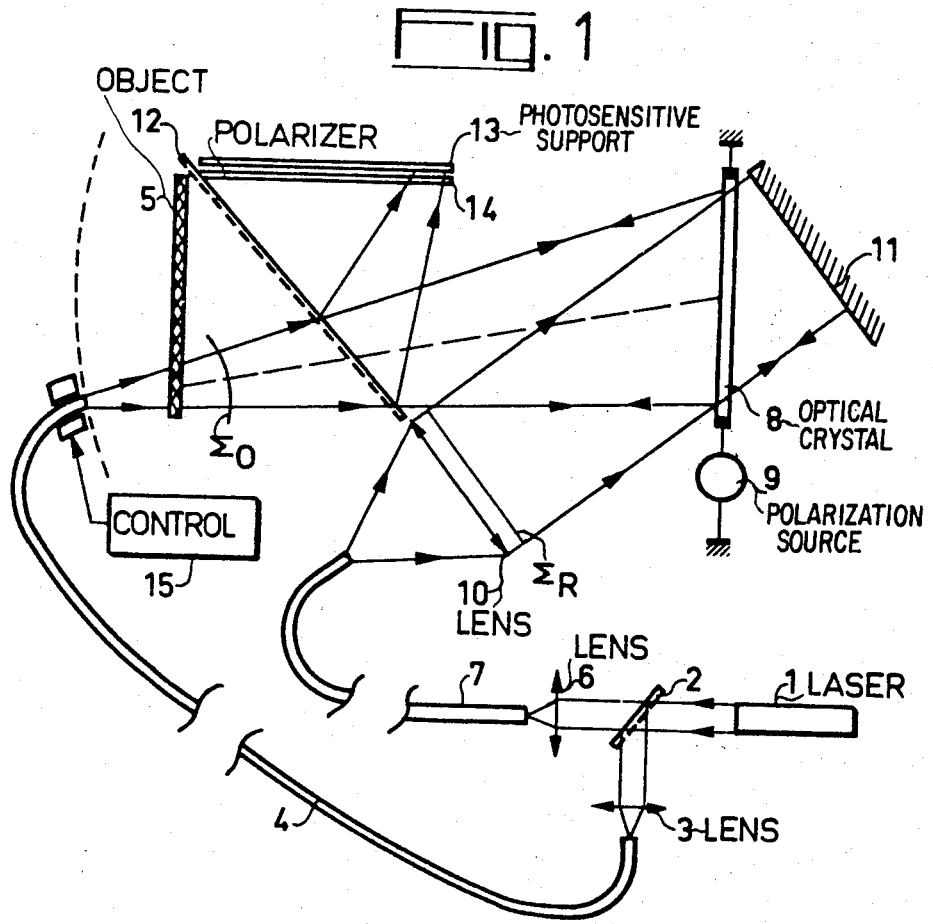
FIG. 1 is a diagram of a first embodiment of the object printing device according to the invention utilizing holographic printing.
Figure 2:
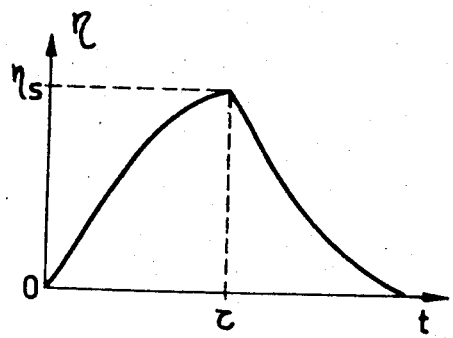
FIG. 2 is a graph by the inscription-obliteration cycle of the holographic recording support.

The great improvement of the image quality obtained by the planar object printing device according to the invention results from the superimposition in the photosensitive support plane of a large number of images having uncorrelated noises. It is thus possible to attain a signal to noise ratio of the same order of magnitude as that obtained by a planar object printing device using an incoherent printing system, whilst retaining the properties linked with the use of coherent beams, particularly retaining the stigmatism of the restored wave front for any point of the object. The planar object printing device of FIG. 1 comprises a laser 1, specifically an argon laser, which transmits radiation onto a semitransparent plate 2. The radiation reflected by the semitransparent plate 2 is directed at a convergent lens 3 which focuses it onto the inlet face of the multimodal optical fibre bundle 4. Bundle 4 transmits the object radiation emerging from the bundle and which is directed at an ojbect diapositive 5. The object beam illuminates the object diapositive in a small area by means of a spherical wave surface. The object beam from the object diapositive 5 is directed towards a photosensitive electrical optical crystal 8 of large size. This crystal is polarized by means of two electrodes connected to the terminals of a polarization source 9. This photosensitive electrooptical crystal can be a BSO ($Bi_{12}SiO_{20}$) crystal. Such a support makes it possible to record in real time phase holograms and as a result of its good sensitivity the construction time $\tau$ of the space-charge field for a saturation diffraction efficiency $\eta_s$ is of the order of 1 millisecond with an incident laser power of the order of 100 mW cm$^{-2}$. The symmetrical characteristic of the diffraction efficiency of the crystal $\eta$ as a function of time is shown in FIG. 2. Such a reversible crystal permits the construction of phase holograms and their reading in real time.

This crystal is illuminated by a reference wave from the semitransparent plate 2 after passing through a lens 6, which focuses the radiation which it receives on the intake face of a monomodal optical fibre 7. The radiation emerging from this beam is transmitted to a lens 10, which forms a plane wave front $\Sigma_R$ for interfering with the wave front $\Sigma_O$ emerging from the object in the photosensitive electrooptical crystal 8. The device also has a plane mirror 11 which is parallel to the reference wave front $\Sigma_R$ and which serves to retransmit to the crystal 8 that part of the reference beam which is not absorbed by the crystal 8 during recording. This arrangement makes it possible to form a reading wave front, which is phase conjugate with the reference wave front and therefore makes it possible to generate in real time a restored wave front which is conjugate with the incident object wave front. The real image formed by this wave front is separated from the real object by means of a separating plate 12. Thus, this image is formed in an image plane and a photosensitive support 13 is placed in that plane for recording the image. An appropriately oriented polarizer 14 makes it possible to insulate the photosensitive support from the noise. Thus, the polarization state of the beam restored during the reading differs from that of the recording beams due to birefringence and the rotatory power of the electrooptical crystal and the restored beam can therefore be separated from the ambient optical noise.

A mechanical translation control device 15 acts on the multimodal optical fibre bundle 4 forming the spherical object wave $\Sigma_o$ for displacing the end of said bundle in such a way as to successively illuminate the complete object by a small diameter spot. The object radiation emerging from the object illuminates the crystal in a zone which is also illuminated by the reference beam. This scan is reproduced a large number of times, i.e. N times. As the photosensitive support 13 has an inscription time constant T which is much higher than $\tau$ the number N of possible scans prior to the complete recording of the photosensitive support 13 is high. During two successive restorations in the same zone, the illumination corresponding to the modulation introduced by the object diapositive is the same in the two restoration processes. However, the supplementary illumination due to speckle of the mask or of the recording material differs. Thus, as a result of the scanning the object waves successively illuminating the same zone during two successive exposures is modified and the ambient illumination due to diffusion by the grains of the mask differs. In the same way, the restored beam is also differently affected by the speckle due to the recording material. The superimposing of N uncorrelated noises leads, at the end of the cycle, to an average noise which is also distributed over the entire imaged surface. Experience has shown that the signal to noise ratio obtained in this way is of the same order as that obtained in incoherent optics. The scanning device acts on the beam either intermittently or continuously in order to displace its end in two orthogonal directions X and Y in such a way that the entire surface of the object is scanned. When scanning is performed step by step the displacement speed can be chosen so that the interference grating is saturation recorded and read in real time before a new zone is illuminated that the maximum contrast is formed between the interference fringes recorded in the material.

A specific reading configuration has been described to permit the continuous observation of the wave front defracted by the crystal, the unabsorbed part of the reference beam being transmitted back to the crystal via the plane mirror 11 parallel to the reference wave front $\Sigma_R$. However, the invention is not limited to this specific reading configuration and the reading beam conjugate with the reference beam making it possible to restore in real time a wave front conjugate with a complex initial wave front can be obtained in a different way, e.g. after division with a separating plate of the reference radiation.

The first embodiment of the invention is particularly suitable for the printing of extensive planar objects. Thus, a small area of the object is illuminated by the object wave and the system of fringes is recorded throughout the holographic material, whereby the incident beam on the object can be oriented in such a way that the beam emerging from the object is appropriately received by the recording material.

FIG. 3 shows a second embodiment of the planar object printing device operating by holographic printing, but in this case the object is successively illuminated several times in its entirety, a diffuser placed between the source and the object being moved between two successive exposures in such a way that the wave front from the object is modified and is affected in different ways by the granularity of the object. In the same way, the recorded fringes grating differs from one recording to the next, to that the restored beam is affected differently by the granularity of the holographic recording material. After an adequate number of recordings and restorations the noise produced by speckle is averaged for the complete photosensitive support. The device shown in FIG. 3, like that of FIG. 1, incorporates a laser source 1 and a semireflecting plate 2.

The optical illuminating device comprises a lens 16 forming a spherical wave surface directed at the object diapositive from it by means of a mirror 17. A diffuser 18 is positioned just in front of the object 5 and is able to rotate, being controlled by a motor 19. The object wave $\Sigma_o$ emerging from object 5 is received by a reversible holographic recording support 8 which, like in the device of FIG. 1, can be a BSO crystal polarized by means of a polarization source 9. The reference beam is formed from the radiation transmitted by the plate 2 and is directed at the holographic support by means of a mirror 20. A system of lenses 6 and 10 makes it possible to form a plane wave $\Sigma_R$ directed at the support. As in the previous case, for restoration purposes, a mirror 11, which is parallel to the surface $\Sigma_R$ returns to the support that part of the reference beam not absorbed by the support. The printing device comprises the partly reflecting plate 12, the polarizer 14 and the photosensitive support 13. To obtain optimum performance with such a device, the object is illuminated for each position of the diffuser for a period corresponding to the time necessary for the saturation recording of the interference grating in the holographic support, restoration being obtained in real time. The diffuser is then rotated and the same operation is reproduced. The number of exposures is a function of the inscription time constant of the photosensitive support.

FIG. 4 shows another embodiment in which the planar object is illuminated in a small diameter area which scans the complete object, but in the present embodiment scanning is obtained by optical deflection means. Moreover, the device permitting the restoration of a wave front forming a real image differs.

The device comprises a laser source 1, a partly transparent plate 2 and an optical deflector 21 controlled by a control circuit 22. A lens 23 makes it possible to form a lighting spot having a small diameter compared with the size of the surface of the object. The spot is formed from the variable direction beam emerging from the deflector. The control circuit 22, deflector 21 and lens 23 are such that the lighting spot scans the complete object. The beam emerging from the deflector has been shown in a central position (solid line) and in two end positions in accordance with direction X. Scanning can also take place in the direction Y which is orthogonal to the direction X in order to scan the complete object. In this embodiment, the device making it possible to generate an image wave front conjugate with the wave front emerging from the object is a cell 24 operating from non-linear mixing. This cell can contain sodium vapour. Such a cell functions as follows. When the cell receives two plane waves of opposite directions interacting in the medium and formed by means of three mirrors 25, 26, 27 from the radiation reflected by the plate 2, said two waves are called "pump" waves and the object wave $\Sigma_o$, said cell restores in real time a wave conjugate with the object wave $\Sigma_o$ amplified compared with the wave. The generation of the amplified wave is instantaneous, so that the scanning of the object is continuous. As in the first embodiment, the scanning is reproduced several times in such a way that the speckle effect is averaged out in each area of the photosensitive support. To this end, it is necessary that the energy of the restored beam scanning the photosensitive support is much lower than the inscription energy of the photosensitive support, so that the averaging effect of the optical noise due to speckle is definitely obtained.

The invention is not limited to the embodiments of the printing device shown hereinbefore. In particular the scanning device described in the embodiment of FIG. 4 can replace that described in the embodiment of FIG. 1 and vice versa. Moreover, in the device described in FIG. 3, for which the illumination of the object is performed on an overall basis, it is possible to use a cell with non-linear mixing of the type described in the embodiment of FIG. 4 for generating a wave front, for forming the image, which is conjugate with the wave front emerging from the object.

In general terms, any device making it possible to generate in real time a wave which is conjugate with an object wave for forming a real image on the photosensitive support can be used in the device according to the invention, provided that its resolution is only limited by diffraction, the illuminating device for the object being such that the object is successively illuminated a number of times until the recording on the photosensitive support is obtained at saturaton level for superimposing in the photosensitive support a plurality of images of the object having uncorrelated noises.

What is claimed is:

1. An optical device for printing duplicates of planar objects comprising: a coherent light source; an illuminating device forming an object wave for illuminating the object using the coherent light from the source, said illuminating device also forming a reference wave using the coherent light from the source; an optically active device for receiving the object wave emerging from the object and the reference wave; a mirror for producing in real time a wave phase-conjugate with the incident object wave; a means supporting a photosensitive recording medium for receiving said wave phase-conjugate to form thereon a real image of the object to be printed; the illuminating device being such that the object is successively illuminated several times in order to superimpose, in the photosensitive recording medium, a plurality of images of the object having uncorrelated noise.

2. A device according to claim 1, wherein the optically active device is a reversible holographic recording means for receiving the object wave emerging from the object and the reference wave, said recording means forming a hologram from which a restored wave is obtained by means of a reading wave which is conjugate to the reference wave front, said restored wave also being received by said support means.

3. A device according to claim 2, wherein the reference wave is a plane wave so that, for forming said reading wave, the device comprises a plane mirror parallel to the reference wave front for transmitting back to said support means that part of the reference wave not absorbed during recording.

4. A device according to either claim 2 or claim 3, wherein the holographic recording support is a photosensitive electrooptical crystal, the holograms recording in such a support being phase holograms.

5. A device according to claim 4, wherein the crystal is a $Bi_{12}SiO_{20}$ crystal polarized in such a way that the electrical field applied is substantially orthogonal to the average direction of the recorded fringes.

6. A device according to claim 1, wherein the optically active device is a non-linear medium for receiving the object wave emerging from the object and two pump waves transmitted in opposite directions in the medium and formed from the reference wave.

7. A device according to claim 6, wherein the nonlinear medium is a cell containing sodium vapour.

8. A device according to claim 1, wherein the illuminating device illuminates the object in an area which is small compared with that of the object, and wherein the illuminating device also comprises scanning means acting on the object wave so as to displace the same by scanning the complete object, said scanning being repeated a number of times.

9. A device according to claim 8, wherein the object wave is a spherical wave coming from a source point formed from the coherent light source.

10. A device according to claim 9, wherein the object wave comes from an optical fibre bundle, scanning being obtained by the mechanical deflection of the end of the bundle.

11. A device according to claim 9, wherein the illuminating device formed from discrete elements forms an object beam source point, the scanning means being an optical deflector acting on the position of said object source point.

12. A device according to claim 1, wherein the illuminating device successively illuminates the entire object a number of times through a diffuser, the device comprising means for rotating the diffuser between two successive illuminations.

* * * * *